(12) United States Patent
Luo et al.

(10) Patent No.: US 11,120,950 B2
(45) Date of Patent: Sep. 14, 2021

(54) SELF-CHARGING DEVICE FOR ENERGY HARVESTING AND STORAGE

(71) Applicants: Tsinghua University, Beijing (CN); HON HAI PRECISION INDUSTRY CO., LTD., New Taipei (TW)

(72) Inventors: Zhi-Ling Luo, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 16/380,261

(22) Filed: Apr. 10, 2019

(65) Prior Publication Data
US 2020/0287222 A1    Sep. 10, 2020

(30) Foreign Application Priority Data
Mar. 6, 2019    (CN) .......................... 201910169048.8

(51) Int. Cl.
| | | |
|---|---|---|
| *H01G 9/15* | (2006.01) | |
| *H01M 6/04* | (2006.01) | |
| *H01G 11/24* | (2013.01) | |

(52) U.S. Cl.
CPC .............. *H01G 9/15* (2013.01); *H01G 11/24* (2013.01); *H01M 6/045* (2013.01)

(58) Field of Classification Search
None
See application file for complete search history.

(56) References Cited

U.S. PATENT DOCUMENTS

| | | | |
|---|---|---|---|
| 9,478,363 B2 * | 10/2016 | Smithyman ............ | H01G 11/84 |
| 2015/0064603 A1 * | 3/2015 | Smithyman ............ | H01G 11/36 |
| | | | 429/492 |
| 2020/0161049 A1 * | 5/2020 | Yializis ............... | C08F 222/102 |

OTHER PUBLICATIONS

Wei Yu et al., High Water-Absorbent and Phase-Change Heat Dissipation Materials Based on Super-Aligned Cross-Stack CNT Films, Feb. 14, 2019, Advanced Engineering Materials, vol. 21, No. 5, p. 1801216.
Ruhao Liu et al., Hydrocapacitor for Harvesting and Storing Energy from Water Movement, Sep. 21, 2018, ACS Applied Materials & Interfaces, vol. 10, No. 41, pp. 35273-35280.

* cited by examiner

*Primary Examiner* — Dion Ferguson
(74) *Attorney, Agent, or Firm* — ScienBiziP, P.C.

(57) ABSTRACT

The disclosure relates to a self-charging device for energy harvesting and storage. The self-charging device for energy harvesting and storage includes a first electrode, a second electrode spaced from the first electrode, a solid electrolyte bridging the first electrode and the second electrode, and a water absorbing structure. The water absorbing structure is located on the second electrode, absorbs water from external environment and transmits the absorbed water to the solid electrolyte.

15 Claims, 21 Drawing Sheets

SELF-CHARGING DEVICE FOR ENERGY HARVESTING AND STORAGE

This application claims all benefits accruing under 35 U.S.C. § 119 from China Patent Application No. 201910169048.8, filed on Mar. 6, 2019, in the China National Intellectual Property Administration, the disclosure of which is incorporated herein by reference.

BACKGROUND

1. Technical Field

The present disclosure relates to a self-charging device for energy harvesting and storage.

2. Description of Related Art

Harvesting energy from environment is a promising strategy to alleviate the global energy shortage and has great application potential in portable electronics. Up to now, various types of generators have been reported. Thermal energy, mechanical energy, and solar energy can all be harvested through thermoelectric, triboelectric/piezoelectric, and photoelectric effects respectively. Recently, great progresses have been made in harvesting energy from the interactions between water and various kinds of materials. In spite of the progress mentioned above, there are still many barriers hindering the effective utilization of water movement for energy generation. For example, the power density is too low because of the large internal resistance. The requirement of rigid working condition and complex experimental configuration is another challenge. Moreover, the conversion of energy from water movement to electric energy often requires artificial water supply, so the movement of water in the natural environment can not be directly utilized.

What is needed, therefore, is a self-charging device for energy harvesting and storage that overcomes the problems as discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
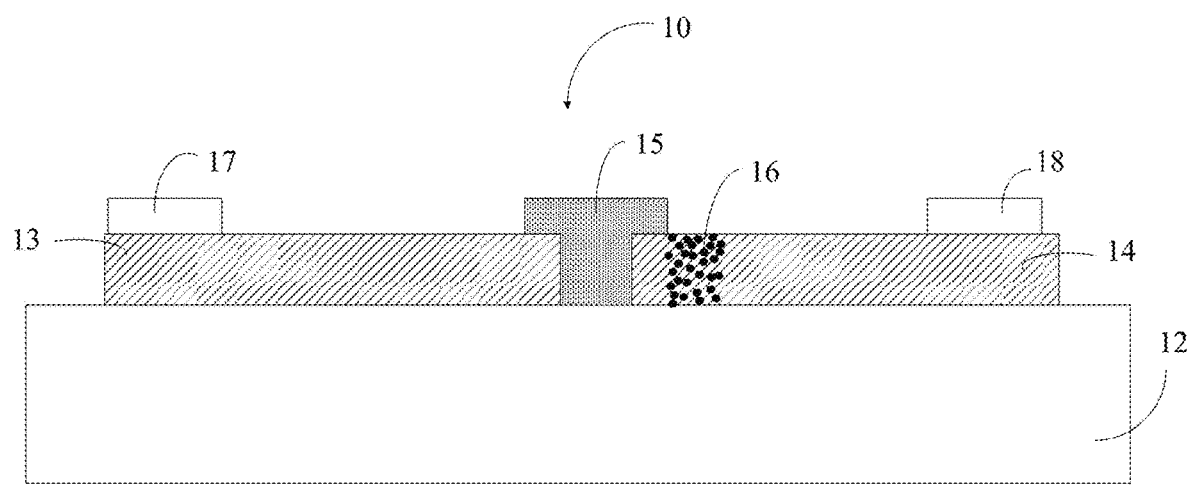
FIG. 1 is a schematic sectional view of one embodiment of a self-charging device for energy harvesting and storage.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not considered as limiting the scope of the embodiments described herein.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present self-charging device for energy harvesting and storage.

Figure 2:
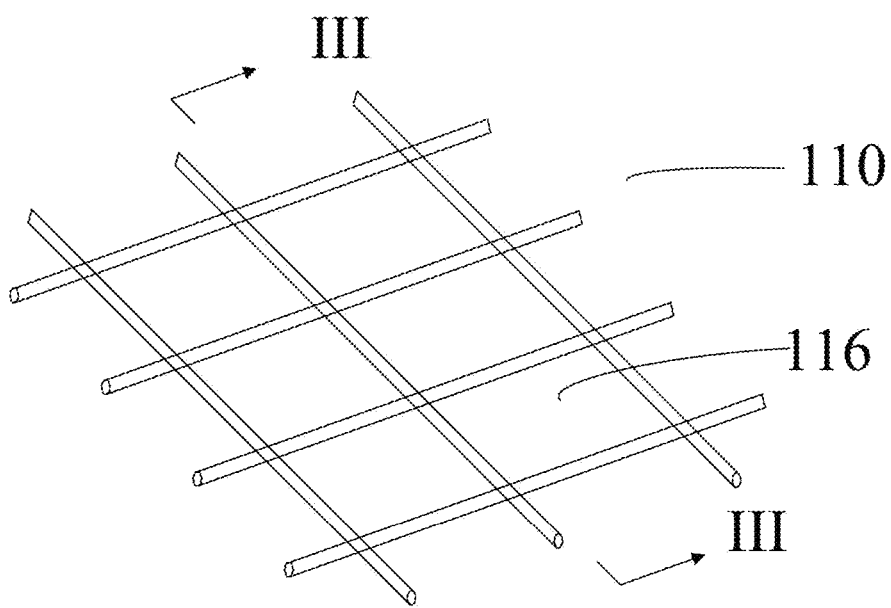
FIG. 2 is a schematic sectional view of one embodiment of a carbon nanotube (CNT) structure
Figure 3:
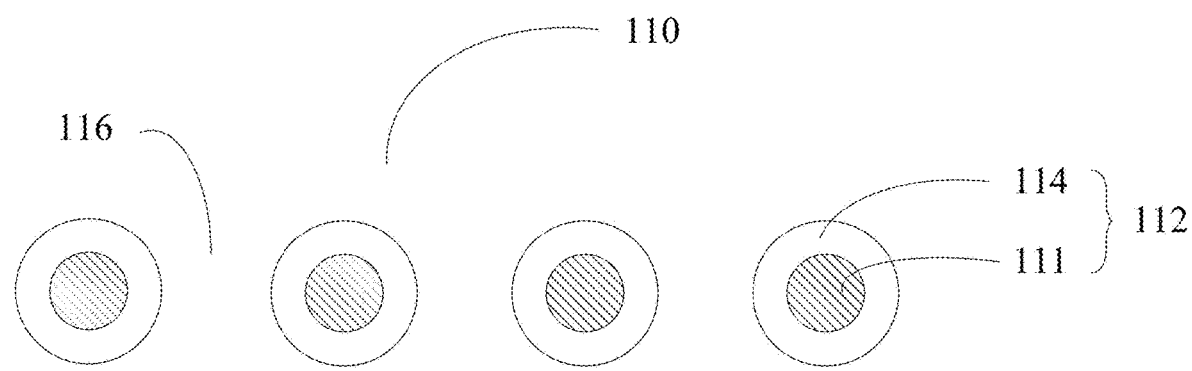
FIG. 3 is a cross-sectional view, along a line of FIG. 2.

Referring to FIGS. 1-3, a self-charging device 10 for energy harvesting and storage of one embodiment is provided. The self-charging device 10 for energy harvesting and storage comprises a substrate 12, a first electrode 13, a second electrode 14, a solid electrolyte 15, and a water absorbing structure 16. The first electrode 13 and the second electrode 14 are located on a surface of the substrate 12 and spaced apart from each other. The first electrode 13 and the second electrode 14 are bridged by the solid electrolyte 15. The water absorbing structure 16 is located on the second electrode 14, absorbs water from external environment, and transmits the absorbed water to the solid electrolyte 15. The self-charging device 10 for energy harvesting and storage is an asymmetric structure.

The substrate 12 can be a flexible substrate or a hard substrate. The hard substrate can be made of a material such as glass, quartz, silicon dioxide ($SiO_2$), silicon nitride ($Si_3N_4$), alumina ($Al_2O_3$), magnesia (MgO). The flexible substrate 12 can make the self-charging device 10 for energy harvesting and storage have flexibility, so that the self-charging device 10 for energy harvesting and storage can be attached to a curved surface. Specifically, the material of the flexible substrate 12 can be polyethylene terephthalate (PET), polyimide (PI), polymethyl methacrylate (PMMA), polydimethylsiloxane (PDMS), or polyethylene naphthalate (PEN), etc. A shape, a size and a thickness of the flexible substrate are not limited and can be selected according to applications. In one embodiment, the substrate 12 is a PET sheet.

The first electrode 13 and the second electrode 14 can be made of a conductive material such as carbon nanotube, graphene, or carbon fibre. In one embodiment, the first electrode 13 and the second electrode 14 both comprise a carbon nanotube structure 110. The carbon nanotube structure 110 comprises a plurality of carbon nanotubes intersected with or spaced from each other and a plurality of openings 116 defined between the adjacent carbon nanotubes. Containing the openings 116, the first electrode 13 and the second electrode 14 have good permeability, which is good for water movement. The first electrode 13 and the second electrode 14 show good mechanical properties.

The carbon nanotube structure 110 can be a pure carbon nanotube structure 111 or a carbon nanotube composite structure 112. The pure carbon nanotube structure 111 means that the carbon nanotube structure 110 consists of a plurality of carbon nanotubes and does not include other structural components. The carbon nanotube composite structure 112 comprises a pure carbon nanotube structure 111 and a functional layer 114 coated on the pure carbon nanotube structure 111.

The pure carbon nanotube structure 111 includes a plurality of carbon nanotubes uniformly distributed therein. The plurality of carbon nanotubes extend along directions substantially parallel to the surface of the pure carbon nanotube structure 111. The carbon nanotubes in the carbon nanotube structure 111 can be combined with each other by van der Waals attractive force therebetween. The carbon nanotubes can be disorderly or orderly arranged in the pure carbon nanotube structure 111. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction, or the pure carbon nanotube structure 111 have two or more sections within each of which the carbon nanotubes are arranged approximately along a same direction (different sections can have different directions). The carbon nanotubes in the pure carbon nanotube structure 111 can be single-walled, double-walled, or multi-walled carbon nanotubes.

The plurality of carbon nanotubes are tightly connected by Van der Waals forces, so that the pure carbon nanotube structure 111 and the carbon nanotube composite structure 112 are a free-standing structure. The term "free-standing" indicates that the carbon nanotube structure 110 can sustain a weight of itself when it is hoisted a portion thereof without any significant damage to its structural integrity. Thus, the carbon nanotube structure 110 can be suspended by two supports space apart.

The functional layer 114 is coated on surfaces of the plurality of carbon nanotubes. In one embodiment, the functional layer 114 is coated on the surface of each carbon nanotube. The functional layer 114 is combined with the carbon nanotube structure 111 by van der Waals attractive force therebetween only. The plurality of carbon nanotubes can be orderly arranged to form an ordered carbon nanotube structure, and apertures are defined in the ordered carbon nanotube structure. The apertures extend throughout the pure carbon nanotube structure 111 from the thickness direction. The plurality of carbon nanotubes can be single-walled carbon nanotubes, double-walled carbon nanotubes, or multi-walled carbon nanotubes. The plurality of carbon nanotubes are parallel to a surface of the pure carbon nanotube structure 111. The surface is the largest surface of the carbon nanotube structure 111 formed by arranging the plurality of carbon nanotubes substantially parallel in the surface. A length and a diameter of the carbon nanotubes can be selected according to applications. The diameters of the single-walled carbon nanotubes range from about 0.5 nanometers to about 10 nanometers. The diameters of the double-walled carbon nanotubes can range from about 1.0 nanometer to about 15 nanometers. The diameters of the multi-walled carbon nanotubes can range from about 1.5 nanometers to about 500 nanometers. The length of the carbon nanotubes can be greater than 50 micrometers. In one embodiment, the length of the carbon nanotubes can range from about 200 micrometers to about 900 micrometers.

The apertures can be a plurality of holes defined by several adjacent carbon nanotubes intersected with each other or a plurality of gaps defined by adjacent two substantially parallel arranged carbon nanotubes and extending along an axial direction of the carbon nanotubes. The plurality of holes and the plurality of gaps can co-exist in the pure carbon nanotube structure 111. Hereafter, a size of each of the plurality of apertures is the diameter of the hole or a width of the gap. The sizes of the apertures can be different.

The sizes of the apertures can range from about 2 nanometers to about 500 micrometers, or about 20 nanometers to about 60 micrometers, or about 80 nanometers to about 5 micrometers, or about 200 nanometers to about 1.5 micrometers. The sizes refer to the diameters of the holes or the distances between the gaps in the width direction.

The pure carbon nanotube structure 111 comprises at least one carbon nanotube film, at least one carbon nanotube wire, or the combination thereof. In one embodiment, the pure carbon nanotube structure 111 comprises a single carbon nanotube film or two or more carbon nanotube films stacked together. Thus, the thickness of the carbon nanotube structure 111 can be controlled by a number of the stacked carbon nanotube films. The carbon nanotube film includes a plurality of uniformly distributed carbon nanotubes. The plurality of uniformly distributed carbon nanotubes are arranged approximately along the same direction. In one embodiment, the pure carbon nanotube structure 111 is formed by folding a single carbon nanotube wire. The carbon nanotube wire can be untwisted or twisted. In one embodiment, the pure carbon nanotube structure 111 can be a layer structure. The layer structure comprises a plurality of carbon nanotube wires, and the plurality of carbon nanotube wires are parallel to and spaced apart with each other. In another embodiment, the pure carbon nanotube structure 111 can be a carbon nanotube network structure. The carbon nanotube network structure comprises a plurality of carbon nanotube wires, and the plurality of carbon nanotube wires are intersected or weaved together. A distance between two adjacent carbon nanotube wires can range from about 1 nanometer to about 0.5 micrometers. Gaps between two adjacent carbon nanotube wires are defined as the apertures. The sizes of the apertures can be controlled by controlling the distances between two adjacent carbon nanotube wires. The lengths of the gaps between two adjacent carbon nanotube wires can be equal to the lengths of the carbon nanotube wires. It is understood that any carbon nanotube structure as described above can be used with all embodiments.

Figure 5:
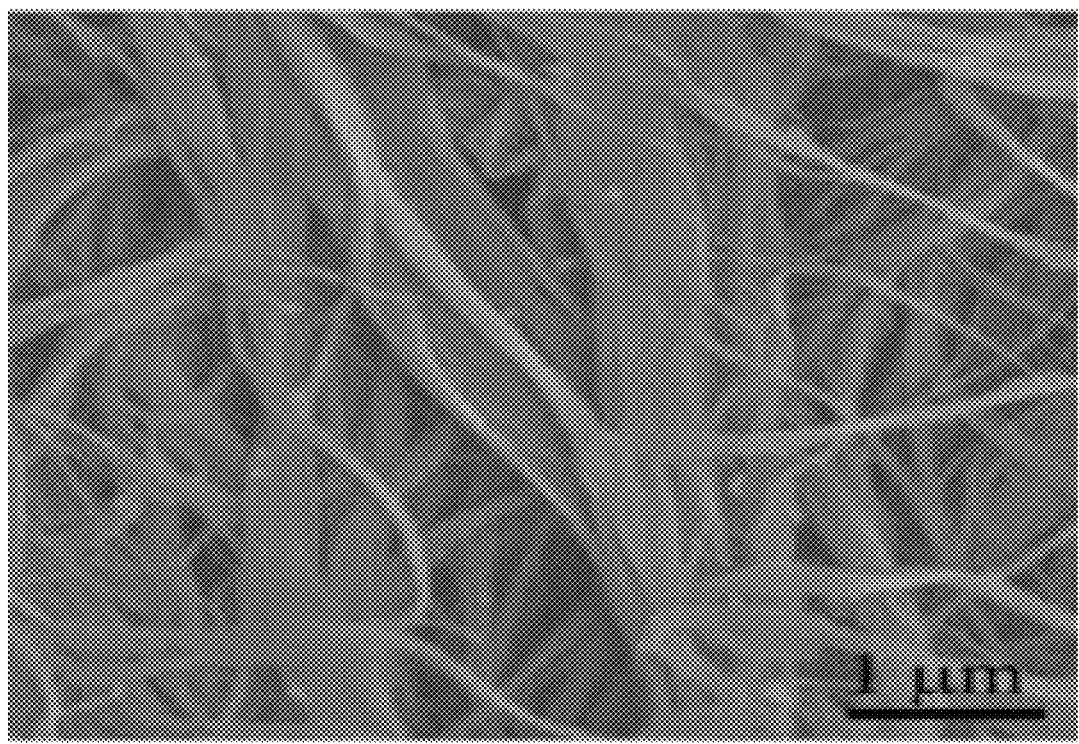
FIG. 5 is a SEM image of a flocculated carbon nanotube film of one embodiment.

In one embodiment, the pure nanotube structure 111 includes at least one drawn carbon nanotube film. The drawn carbon nanotube film can be drawn from a carbon nanotube array that is able to have a film drawn therefrom. The drawn carbon nanotube film includes a plurality of successive and oriented carbon nanotubes joined end-to-end by van der Waals attractive force therebetween. The drawn carbon nanotube film is a free-standing structure. FIG. 5, each of the drawn carbon nanotube films includes a plurality of successively oriented carbon nanotube segments joined end-to-end and side-by-side by van der Waals attractive force therebetween. Each of the carbon nanotube segments includes a plurality of carbon nanotubes parallel to each other, and joined by van der Waals attractive force therebetween. As can be seen in FIG. 3, some variations can occur in the drawn carbon nanotube film. The carbon nanotubes in the drawn carbon nanotube film are oriented along a preferred orientation. The drawn carbon nanotube film can be treated with an organic solvent to increase a mechanical strength and a toughness and to reduce a coefficient of friction of the drawn carbon nanotube film. Diameters of carbon nanotube segments can range from about 10 nanometers to 200 nanometers. In one embodiment, the diameters of nanotube segments can range from about 10 nanometers to 100 nanometers. The drawn carbon nanotube film defines apertures between adjacent carbon nanotubes. The apertures extend throughout the drawn carbon nanotube film along the thickness direction thereof. The apertures can be micro pores or gaps. In one embodiment, the pure carbon nanotube structure 111 includes one drawn carbon nanotube film. Gaps are defined between the adjacent carbon nanotube segments in the carbon nanotube film. Sizes of the gaps can range from about 1 nanometer to 0.5 micrometers.

The pure carbon nanotube structure 111 can also include at least two of the drawn carbon nanotube films stacked together. In other embodiments, the pure carbon nanotube structure 111 can include two or more of the carbon nanotube films which coplanar arranged. Additionally, when the carbon nanotubes in the carbon nanotube film are aligned along the preferred orientations (e.g., the drawn carbon nanotube film), an angle can exist between the preferred orientations of adjacent carbon nanotubes films, whether the carbon nanotube films are stacked together or arranged side-by-side. Adjacent carbon nanotube films can be joined by the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked drawn carbon nanotube films is larger than 0 degrees, a plurality of micropores are defined by the pure carbon nanotube structure 111. In one embodiment, the pure carbon nanotube structure 111 has the aligned directions of the carbon nanotubes between adjacent stacked carbon nanotube films at 90 degrees. Diameters of the micropores can range from about 1 nanometer to about 0.5 micrometers. The thickness of the pure carbon nanotube structure 111 can range from about 0.01 micrometers to about 100 micrometers. Stacking the carbon nanotube films will also add to the structural integrity of the pure carbon nanotube structure 111.

Figure 4:
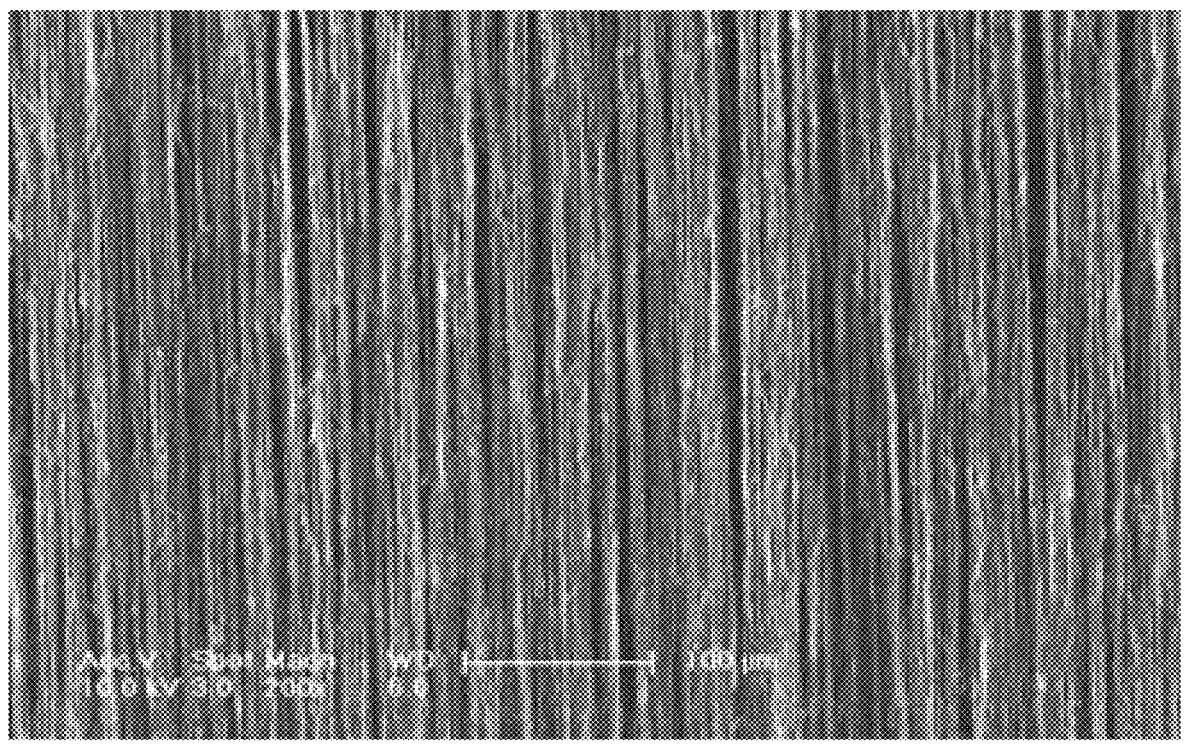
FIG. 4 is a Scanning Electron Microscope (SEM) image of a drawn carbon nanotube film of one embodiment.

Referring to FIG. 4, in another embodiment, the pure carbon nanotube structure 111 can include at least one flocculated carbon nanotube film formed by a flocculating method. The flocculated carbon nanotube film can include a plurality of long, curved, disordered carbon nanotubes entangled with each other. The length of the carbon nanotube film can be greater than 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. Due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micrometer to about 1 millimeter. Many of the embodiments of the carbon nanotube structure are flexible and do not require the use of a structural support to maintain their structural integrity. The flocculated carbon nanotube film can be a pure carbon nanotube film only including carbon nanotubes.

Figure 6:
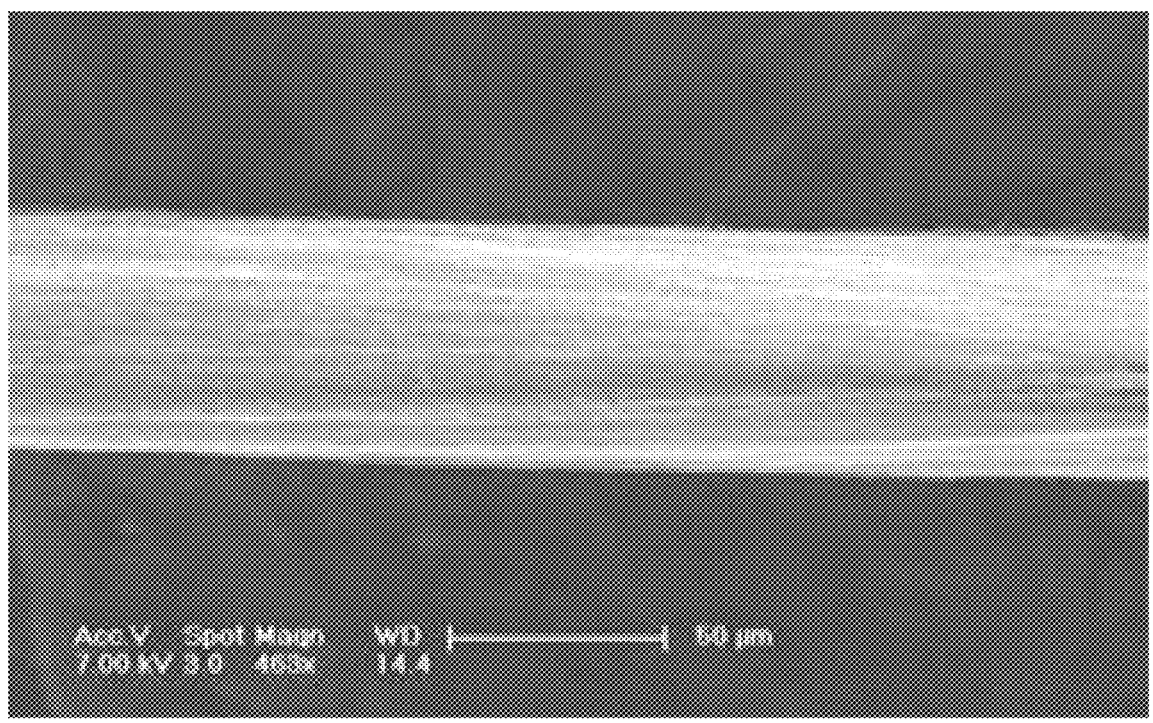
FIG. 6 is a SEM image of an untwisted carbon nanotube wire of one embodiment.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to surface tensions of the organic solvent as it volatilizes, and thus, the drawn carbon nanotube film will shrunk into an untwisted carbon nanotube wire. Referring to FIG. 6, the untwisted carbon nanotube wire includes a plurality of carbon nanotubes substantially oriented along the same direction (i.e., a direction along a length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each of the carbon nanotube segments includes a plurality of carbon nanotubes substantially parallel to each other, and joined by van der Waals attractive force therebetween. The carbon nanotube segments can vary in width, thickness, uniformity, and shape. The length of the untwisted carbon nanotube wire can be arbitrarily set as required. A diameter of the untwisted carbon nanotube wire can range from about 0.5 nanometers to about 100 micrometers.

Figure 7:
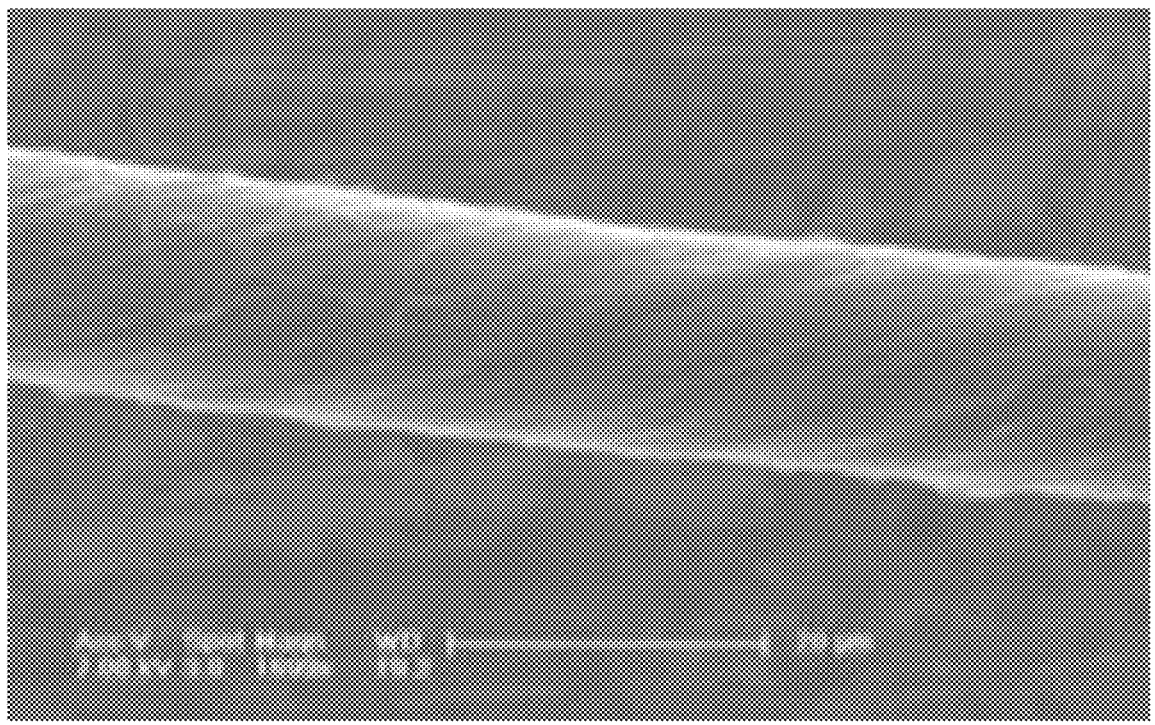
FIG. 7 is a SEM image of a twisted carbon nanotube wire of one embodiment.

The twisted carbon nanotube wire can be formed by twisting a drawn carbon nanotube film by mechanical forces to turn the two ends of the drawn carbon nanotube film in opposite directions. Referring to FIG. 7, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each of the carbon nanotube segments includes a plurality of carbon nanotubes parallel to each other, and joined by van der Waals attractive force therebetween. The length of the carbon nanotube wire can be set as required. A diameter of the twisted carbon nanotube wire can be from about 0.5 nanometers to about 100 micrometers. Further, the twisted carbon nanotube wire can be treated with a volatile organic solvent after being twisted to bundle the adjacent paralleled carbon nanotubes together. A specific surface area of the twisted carbon nanotube wire will decrease, while a density and strength of the twisted carbon nanotube wire will increase.

The carbon nanotube composite structure 112 can be made by coating a functional layer 114 on surfaces of the pure carbon nanotube structure 111. In some embodiment, each of the plurality of carbon nanotubes is fully covered by the functional layer 114. In some embodiment, part of the surface of the pure carbon nanotube structure 111 is covered by the functional layer 114. In one embodiment, the pure carbon nanotube structure 111 can include two stacked drawn carbon nanotube films, and extension directions of the carbon nanotubes between the adjacent drawn carbon nanotube films are vertical.

The plurality of openings 116 are defined by the plurality of apertures of the pure carbon nanotube structure 111. The plurality of openings 116 of the carbon nanotube composite structure 112 and the plurality of apertures of the pure carbon nanotube composite structure 111 may have a same shape but different in size. The sizes of the plurality of openings 116 of the carbon nanotube composite structure 112 are smaller than those of the plurality of apertures because the functional layer 114 is deposited in the plurality of apertures.

The functional layer 114 shows good electric conductivity and good wettability with water. The functional layer 114 can be made of the conductive polymers such as polyaniline (PANI), polythiophene (PT), or polypyrrole (PPy), etc. The materials are not limited to the listed materials mentioned above, as long as it has conductivity and good wettability with water. A thickness of the functional layer 114 is not limited. In one embodiment, the thickness of the functional layer 114 ranges from about 5 nanometers to about 150 nanometers. In another embodiment, the thickness of the functional layer 114 ranges from about 8 nanometers to about 45 nanometers. If the thickness of the functional layer 114 is greater than 150 nanometers, the plurality of apertures may be fully filled by the functional layer 114 and the plurality of openings 116 cannot be obtained.

The method of making the carbon nanotube composite structure 112 comprises the following steps: providing a pure carbon nanotube structure 111, and conductive polymer monomer solution A, wherein the conductive polymer monomer solution A is placed in a container; immersing the pure carbon nanotube structure 111 into the conductive polymer monomer solution A in the container; dropping the conductive polymer monomer solution B into the container, and compounding conducting polymer monomers with the pure carbon nanotube structure 111 to form a carbon nanotube-conducting polymer composite. The conductive polymer monomer can be the material of aniline, pyrrole, thiophene, acetylene, or p-benzene and p-styrene.

In one embodiment, the placing the carbon nanotube structure 110 on the surface further comprises solvent treating the substrate 12 with the carbon nanotube structure 110 thereon. Because there is air between the carbon nanotube structure 110 and the surface of the substrate 12, the solvent treating can exhaust the air and allow the carbon nanotube structure 110 to be closely and firmly adhered on the surface of the substrate 12. The solvent treating can be applying a solvent to entire surface of the carbon nanotube structure 110 or immersing the entire substrate 12 with the carbon nanotube structure 110 in a solvent. The solvent can be water or volatile organic solvent such as ethanol, methanol, acetone, dichloroethane, chloroform, or mixtures thereof. In one embodiment, the organic solvent is ethanol.

The first electrode 13 and the second electrode 14 are located on a surface of the substrate 12, and spaced from each other. The first electrode 13 and the second electrode 14 can be directly attached to the surface of the substrate 12 due to the adhesion of the carbon nanotube structure 110, and can also be attached to the surface of the substrate 12 by a binder. The first electrode 13 and the second electrode 14 can be bridged by solid electrolyte 15.

The solid electrolyte 15 has no conductivity in a dry state, but become conductive after absorbing water. The conductivity of the solid electrolyte 15 increases as the absorbing more and more water. When electrolyte diffusion/fluid passes through a channel or porous structure, a potential is induced across the channels. An electric potential is formed across the solid electrolyte 15 when the self-charging device 10 for energy harvesting and storage exposed to a moisture gradient. This is ascribed to asymmetric reorientation and dislocation of ions under water diffusion in the solid electrolyte 15. The material of the solid electrolyte 15 can be solid polymer which is soluble in water. The solid polymer can be polyvinyl alcohol (PVA) gel or composite gel of polyvinyl alcohol with some ionic compounds such as HCl/PVA, $H_2SO_4$/PVA, $H_3PO_4$/PVA, etc. In one embodiment, the material of the solid electrolyte 15 is HCl/PVA gel. The ionic compounds can ionize cations and anions in water. Cations and anions are separated under the electrolyte diffusion because of their asymmetric interactions with the solid electrolyte 15.

Figure 8:
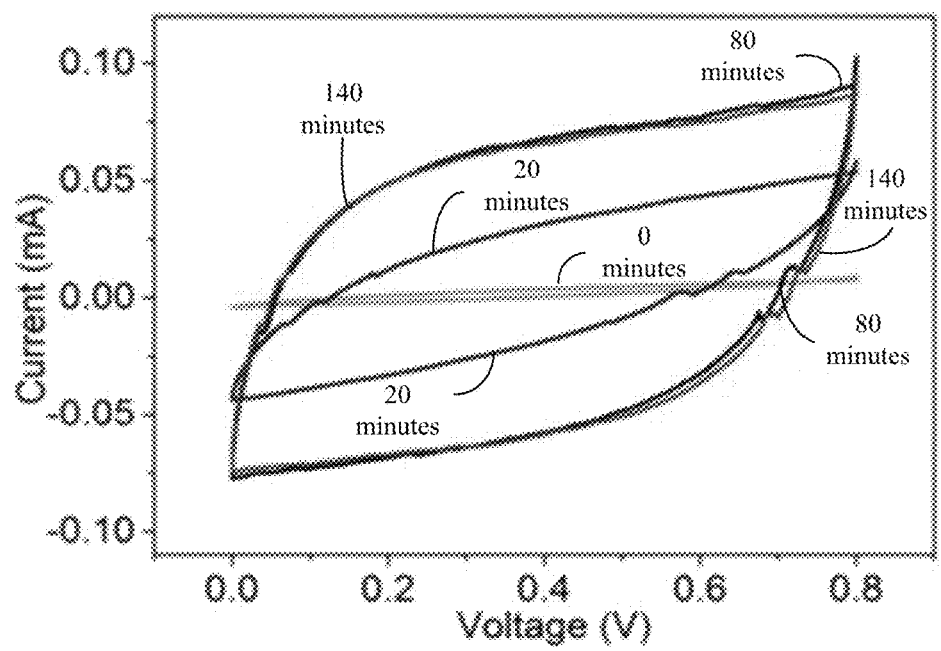
FIG. 8 are Current vs. Voltage curves of the self-charging device for energy harvesting and storage after exposed to the humid environment after different time at a scan rate of 25 mV s$^{-1}$.

The water absorbing structure 16 is an ionic compound, which can produce anions and cations in solvents, such as calcium chloride, calcium sulfate, magnesium sulfate, sodium sulfate, or potassium carbonate, etc. In one embodiment, the material of the water absorbing structure 16 is anhydrous calcium chloride ($CaCl_2$). In another embodiment, the material of the water absorbing structure 16 is calcium chloride dihydrate ($CaCl_2.2H_2O$). The water absorbing structure 16 not only absorbs water, but also acts as an electrolyte. The $CaCl_2$ on the surface of the second electrode 14 can absorb water more quickly so that a local $CaCl_2$ solution can be formed in a shorter time. Therefore, the $CaCl_2$ solution will be formed in the second electrode 14 in a short time and diffuses towards the solid electrolyte 15. The different interactions with solid electrolyte 15 can lead to a net separation of cations and anions under the automatically-formed diffusion of $CaCl_2$ solution, which leads to a potential across the bridge. The upstream of diffusion has a negative potential, indicating that cations are more likely to be carried along by the diffusion flux. That is, negative potential is formed at the second electrode 14, and positive potential is formed at the first electrode 13. Referring to FIG. 8, current-voltage curve (CV curve) of the self-charging device 10 for energy harvesting and storage after exposed to the humid environment after different time at a scan rate of 25 mV $s^{-1}$ is provided. The area of the CV curve has been enhanced by 47 times after 140 min, indicating that the mobility enhancement of ions in the HCl/PVA bridge. This will assist the electrolyte diffusion in HCl/PVA bridge.

The water absorbing structure 16 can be located on any area of the second electrode 14 as long as the water absorbed by the water absorbing structure 16 can be transmitted to the solid electrolyte 15. The water absorbing structure 16 can be contacted with the solid electrolyte 15. The water absorbing structure 16 can also be not in direct contact with the solid electrolyte 15. Since the carbon nanotube structure 110 comprises a plurality of openings 116 which are conducive to water transfer, water absorbed by the water absorbing structure 16 can be transmitted to the solid electrolyte 15 by the carbon nanotube structure 110. In one embodiment, the water absorbing structure 16 is located on the second electrode 14 and in direct contact with the solid electrolyte 15.

In one embodiment, the water absorbing structure 16 is located on part surface of the second electrode 14. The method of locating on the water absorbing structure 16 on the part surface of the second electrode 14 comprises the following steps: preparing the $CaCl_2$ solution by dissolving 25 g anhydrous $CaCl_2$ in 100 mL deionized (DI) water; adding about 10 microlitres (μL) $CaCl_2$ solution to one side of the second electrode 14 near the solid electrolyte 15 to form a prefabricated structure A; and removing the deionized water from the $CaCl_2$ solution by drying the prefabricated structure A in a vacuum oven at 30° C.

Figure 9:
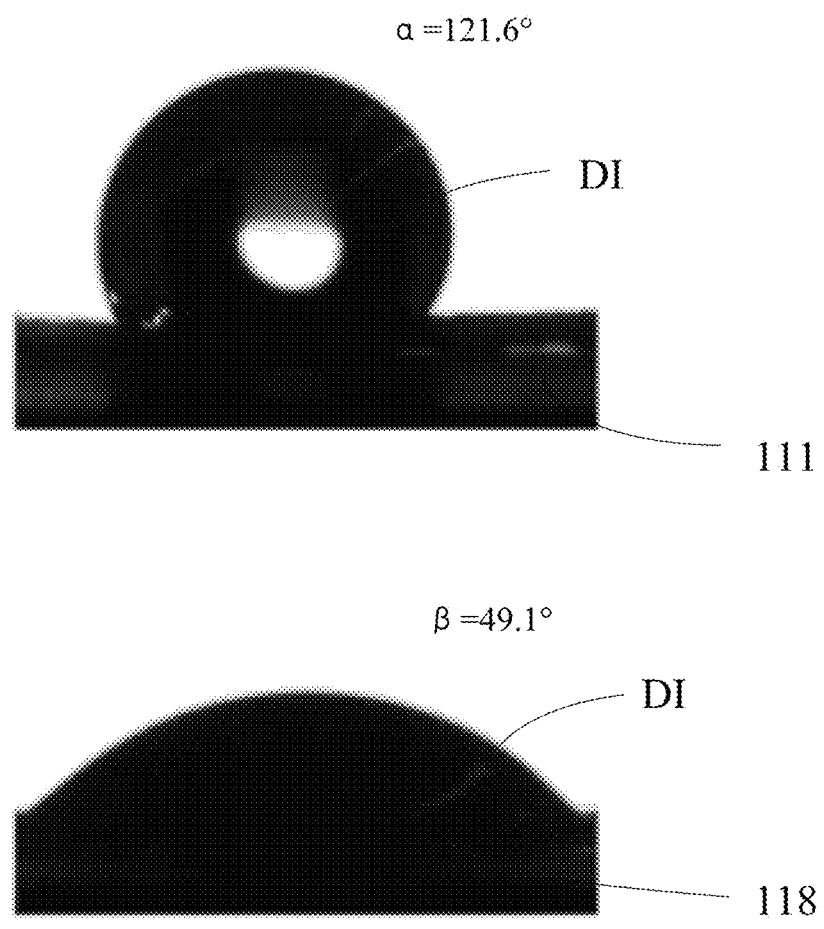
FIG. 9 are diagrams of contact angles of pure CNT and the $CaCl_2$/CNT composites with water.

In another embodiment, the water absorbing structure 16 is located on entire surface of the second electrode 14. The method of locating the water absorbing structure 16 on the entire surface of the second electrode 14 comprises the following steps: preparing the $CaCl_2$ solution by dissolving 25 g anhydrous $CaCl_2$ in 100 mL deionized (DI) water; forming the carbon nanotube composite structure ($CaCl_2$/CNT composites) by immersing the carbon nanotube structure 110 into the $CaCl_2$ solution and ultrasound treating to form a prefabricated structure B; and removing the deionized water from the $CaCl_2$ solution by drying the prefabricated structure B in a vacuum oven at 30° C. Referring to FIG. 9, contact angles of pure carbon nanotube structure (CNT) and the $CaCl_2$/CNT composites are provided. The contact angle between the pure CNT and deionized water (DI water) is about 121.6°, and the contact angle between the $CaCl_2$/CNT composites DI water is about 49.1°, which indicated that the hydrophilia of CNT was greatly improved after being composited with $CaCl_2$.

The self-charging device 10 for energy harvesting and storage can further comprise a first terminal pad 17 located on the surface of first electrode 13 away from the substrate 12 and a second terminal pad 18 located on the surface of the second electrode 18 away from the substrate 12. The material of the first terminal pad 17 and the second lead-put terminal 18 is conductive material such as metal or conductive polymer. In one embodiment, the material is conductive silver paste. The first terminal pad 17 and the second terminal pad 18 are connected to an electronic device through wires to supply power to the electronic device.

The mass of the self-charging device 10 for energy harvesting and storage is small, and can be in a range from about 30 milligram (mg) to 100 mg. In one embodiment, the mass of the self-charging device 10 for energy harvesting and storage ranges from about 40 mg to 60 mg. In another embodiment, the mass of the self-charging device 10 for energy harvesting and storage without the substrate 12 is 50 mg.

In order to research the effect of the solid electrolyte 15 and water absorbing structure 16 on the property of the self-charging device 10 for energy harvesting and storage, the following experiments were carried out.

A device 10' of a comparative example 1 was provided. The device 10' is similar to the self-charging device 10 for energy harvesting and storage except that the device 10' is a symmetric structure without the water absorbing structure 16.

Figure 10:
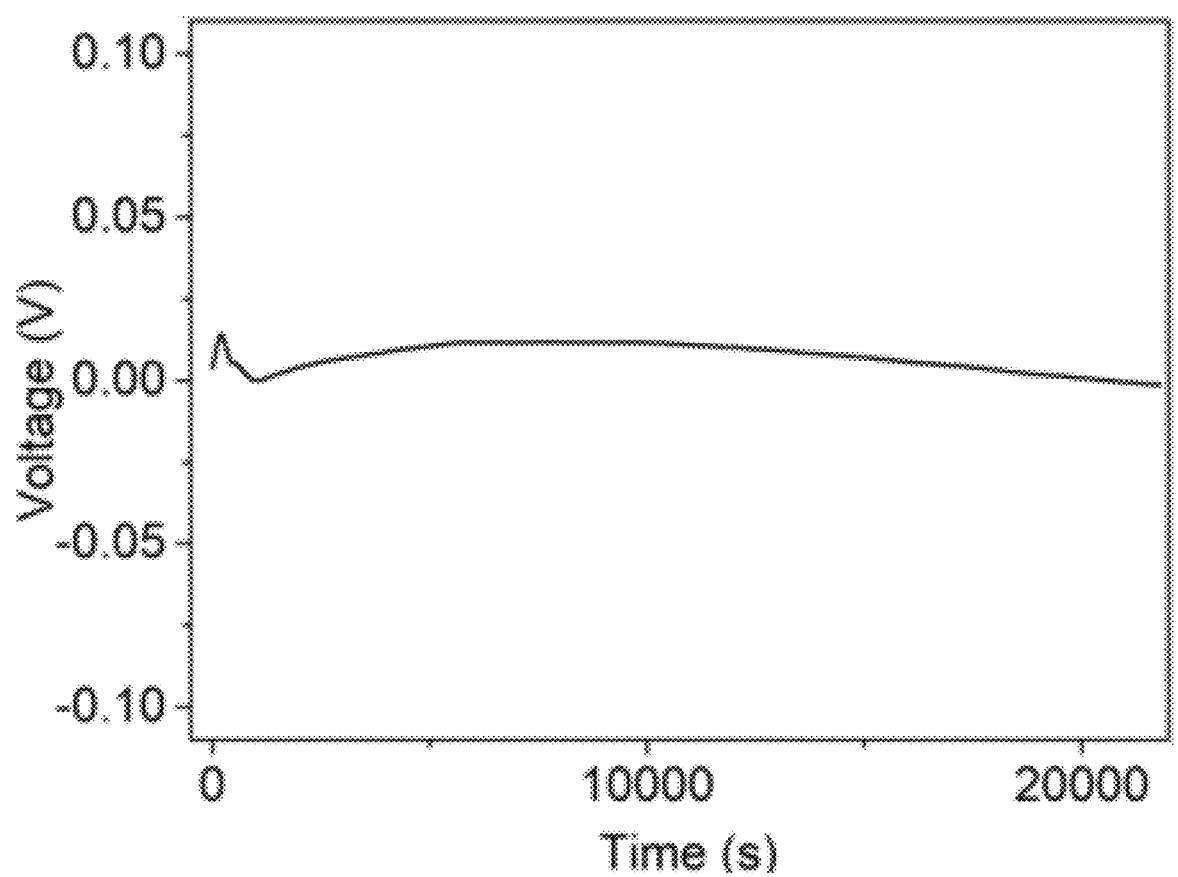
FIG. 10 is a Voltage vs. time curve of a symmetric device of comparative example 1, which has no $CaCl_2$, in a humid environment whose RH is 80%.

The device 10' is put into a humidity cabinet whose relative humidity (RH) is 80% for a period of time. As shown FIG. 10, without $CaCl_2$, the magnitude of the open circuit voltage ($V_{OC}$) is no more than 14 mV and became more and more stable around zero point when exposed to humid condition.

Figure 11:
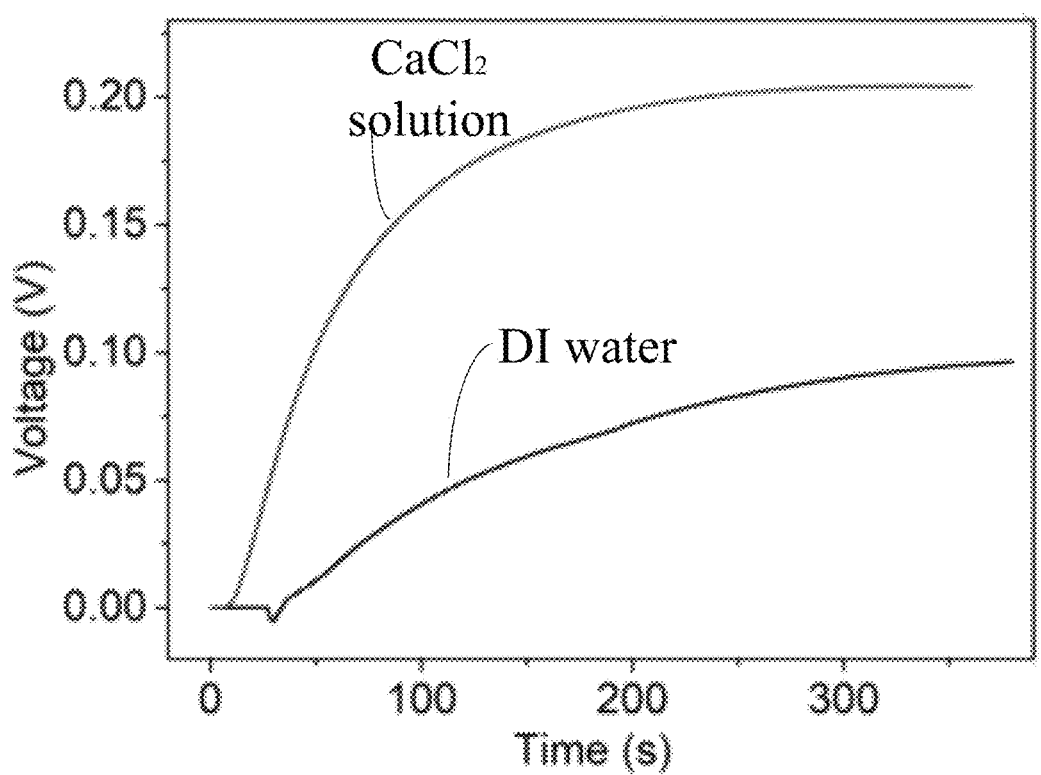
FIG. 11 are Voltage vs. time curves of a symmetric device of comparative example 1 when 10 μL DI water and $CaCl_2$ solution are dropped on the second electrode respectively.

Then, 10 L of DI water and $CaCl_2$ solution were dropped to one side of the HCl/PVA gel bridge of the device 10' respectively. As shown in FIG. 11, a variation curve of the $V_{OC}$ vs. time is provided. There is an output under the flow of DI water, which likely results from the separation of $Cl^-$ and $H^+$. When $CaCl_2$ solution was used, the output reached a higher value, showing the synergistical contribution of $Ca^{2+}$ and $H^+$ to the electric output.

In order to research the output performance of the self-charging device 10 for energy harvesting and storage, the following experiments were carried out. The device 10 was short-circuited and kept in vacuum oven at 30° C. for a period of time to evaporate extra water before measurement.

Figure 12:
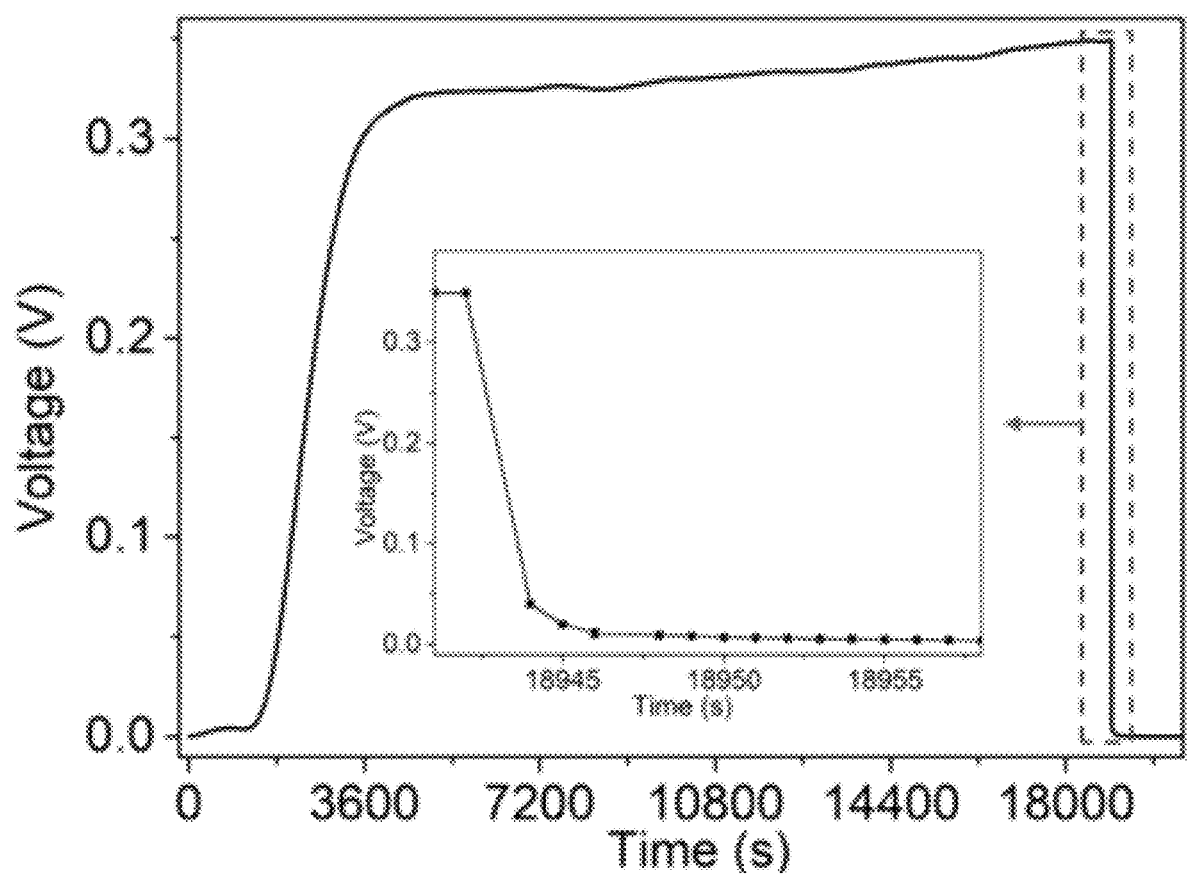
FIG. 12 is a typical moisture induced self-charging process of the device of FIG. 1 in a humid environment wherein the RH is 80%, and the inset shows the magnified discharging process by a resistance of 100Ω.

FIG. 12 shows a typical self-charging process of the self-charging device 10 for energy harvesting and storage. The open circuit voltage ($V_{OC}$) began to rise after the device 10 was transferred to the humidity cabinet whose RH is 80%. After a slow pace at the beginning, the charging rate speeds up that the $V_{OC}$ quickly rose to 0.300 V after 1 hour. Then the charging rate slows down and reaches a maximum value of 0.348 V. When a 100 load is added to the circuit, the voltage decreased to 0.040 volt (V), which corresponds to a current density of 0.40 milliampere per square centimeter (mA $cm^{-2}$) and output power of 16 microwatt per square centimeter (μW $cm^{-2}$). The discharging process is shown in FIG. 2a. The short circuit current ($I_{SC}$) density of the self-charging device 10 for energy harvesting and storage is 0.655 mA $cm^{-2}$ (FIG. 2b) after being charged to 0.287 V, corresponding to a maximum power of 47 μW cm$^{-2}$. This current density is 2-3 orders higher than that of fluid or evaporation generator.

Figure 13:
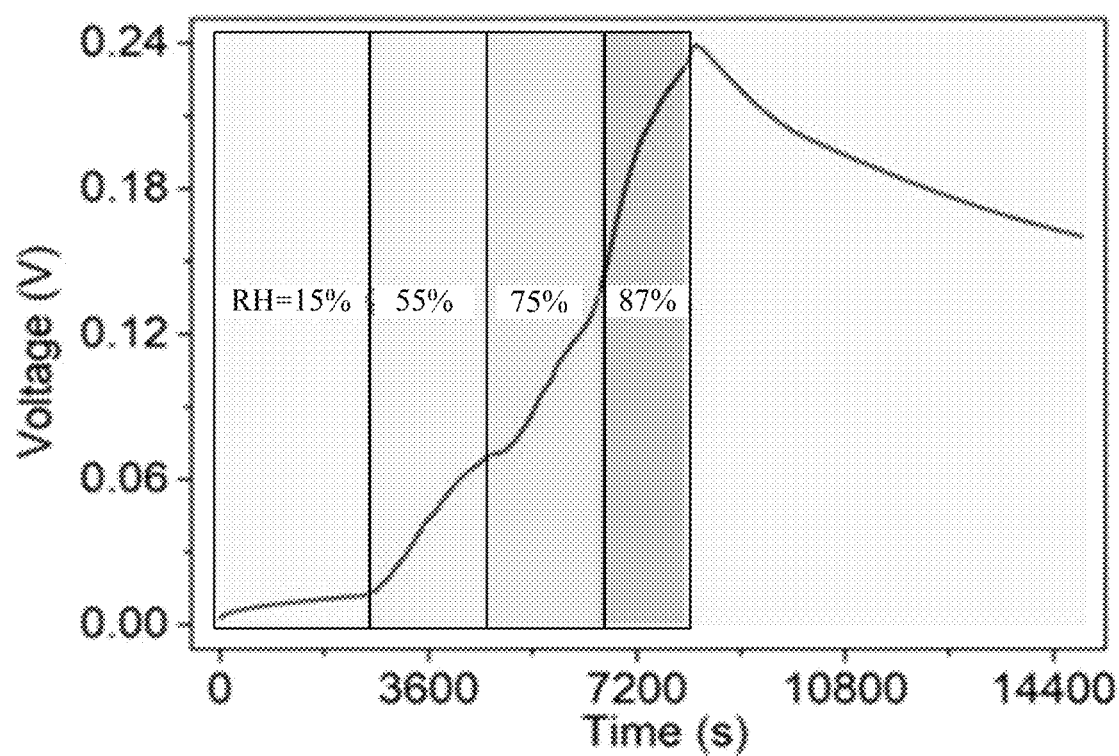
FIG. 13 is a Voltage vs. Time curve of the self-charging process of the device of FIG. 1 when the relative humidity is changed from 15% to 87%.

The relation between humidity and $V_{OC}$ was further studied by tuning the humidity in the humidity cabinet. Referring to FIG. 13, it is found that increasing humidity can boost the self-charging process. The charging rates are 4.1 microvolt per second (μV/s), 25.9 μV/s, 37.1 μV/s and 62.0 μV/s for the relative humidity of 15%, 55%, 75%, and 87% respectively. When the device 10 was taken out of the cabinet, the $V_{OC}$ only decreased from 0.232 V to 0.160 V for 6880 s. This means that the induced electricity can be well stored in the device 10 under a dramatic humid change. Even if the device 10 is removed from the humid environment, the water absorbed by the water absorbing structure 16 can remain for a long time. This is very different from other fluid generator. The output of the other fluid generator vanishes within seconds once the moisture disappears from the environment, and the energy generated by the other fluid generator cannot be timely and effectively stored.

Figure 14:
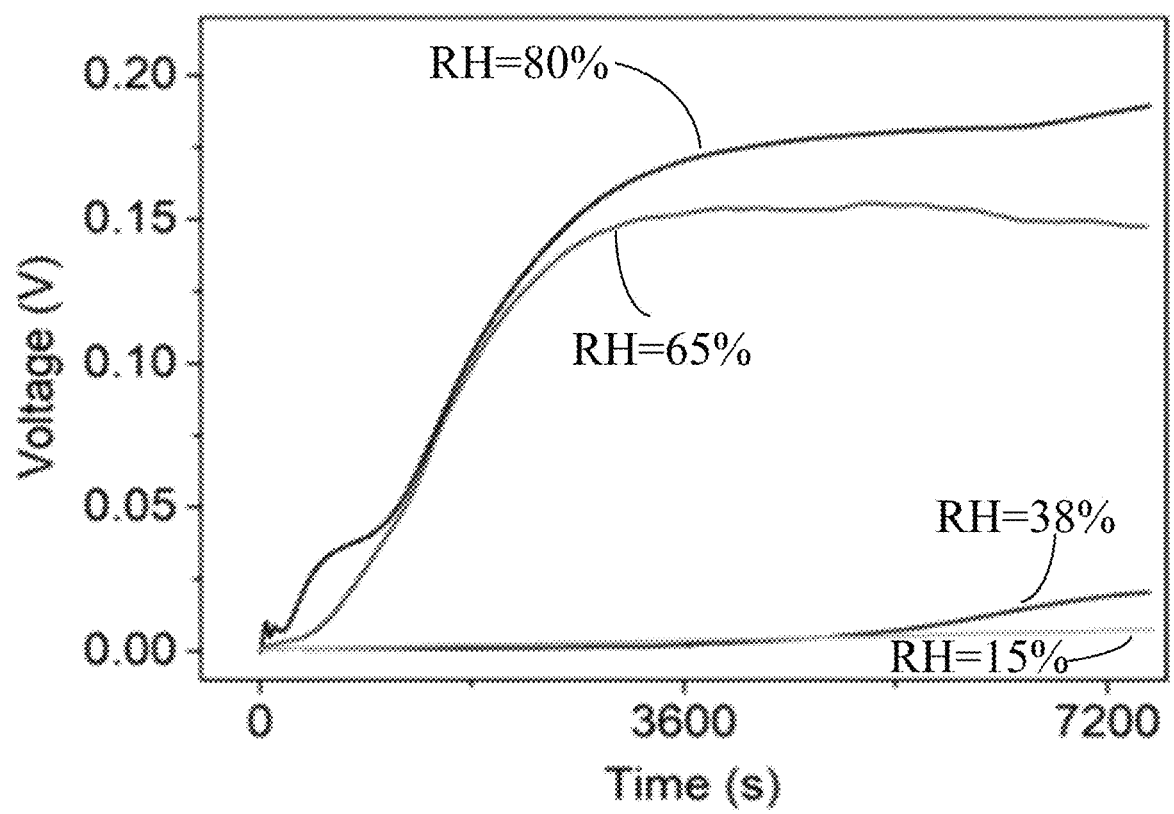
FIG. 14 is an Open Circuit Voltage ($V_{OC}$) vs. Time curve of the self-charging process of the device of FIG. 1 in a humid environment with different relative humidity.

The self-charging curves under different humidity are shown in FIG. 14. The $V_{OC}$ is 7.5 mV, 20.5 mV, 147.4 mV, and 189.1 mV after 7500 s under the relative humidity of 15%, 38%, 65%, and 80%. When the relative humidity is 40%, the $V_{OC}$ rose from 2.6 mV initially to 26.0 mV and 161.2 mV after 4400 s and 18000 s, indicating that the device 10 can also be charged to higher voltage in low humidity but requires a longer time. These results demonstrate that the device 10 can work in a common ambient condition with relative humidity ranging from 40% to 80%, which surely promotes the device 10 application potential.

Figure 15:
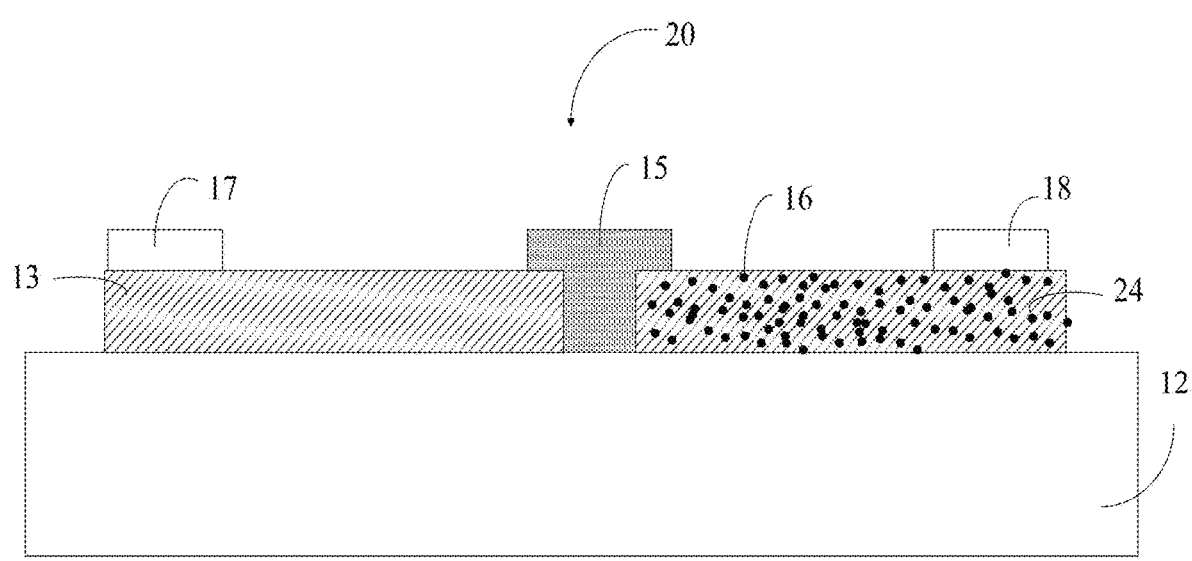
FIG. 15 is a schematic sectional view of another embodiment of a self-charging device for energy harvesting and storage.

Referring to FIG. 15, a self-charging device 20 for energy harvesting and storage of another embodiment is provided. The self-charging device 20 for energy harvesting and storage comprises a substrate 12, a first electrode 13, a second electrode 24, and a solid electrolyte 15. The first electrode 13 and the second electrode 24 are located on a surface of the substrate 12 and spaced apart from each other. The first electrode 13 and the second electrode 24 are bridged by the solid electrolyte 15. The second electrode 24 comprises a carbon nanotube structure 110 and a water absorbing structure 16 located on the entire surface of the carbon nanotube structure 110. The self-charging device 20 for energy harvesting and storage is an asymmetric structure. The self-charging device 20 for energy harvesting and storage further comprises a first terminal pad 17 located on the surface of first electrode 13 away from the substrate 12 and a second terminal pad 18 located on the surface of the second electrode 18 away from the substrate 12.

Figure 16:
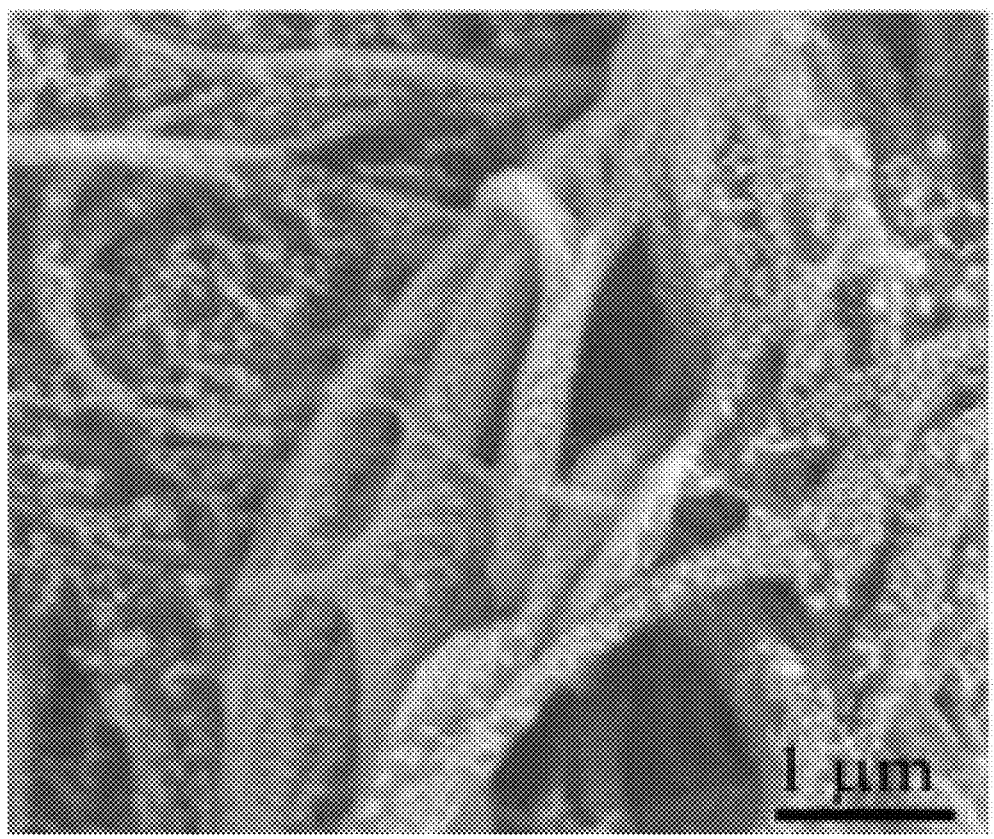
FIG. 16 is a SEM image of a flocculated carbon nanotube film coated with $CaCl_2$.

The self-charging device 20 for energy harvesting and storage is similar to the self-charging device 10 for energy harvesting and storage above except that, in the self-charging device 20 for energy harvesting and storage, the second electrode 24 comprises a carbon nanotube structure 110 and a water absorbing structure 16 located on the entire surface of the carbon nanotube structure 110. As shown in FIG. 16, each of the carbon nanotubes is entirely coated by the CaCl$_2$.

Figure 17:
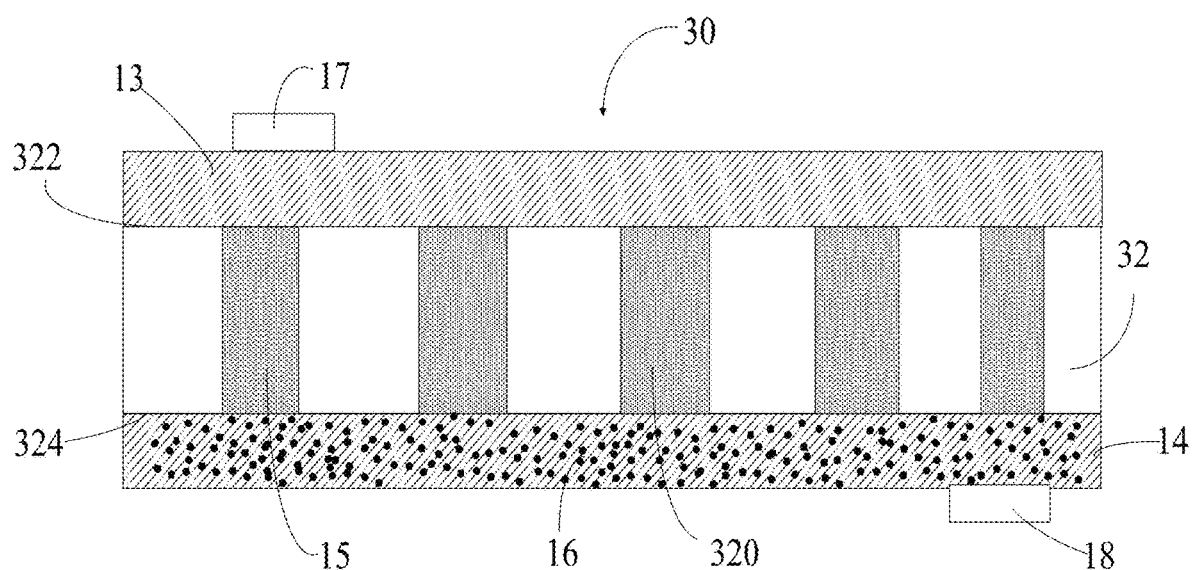
FIG. 17 is a schematic sectional view of another embodiment of a self-charging device for energy harvesting and storage.

Referring to FIG. 17, a self-charging device 30 for energy harvesting and storage of another embodiment is provided. The self-charging device 30 for energy harvesting and storage comprises a substrate 32, a first electrode 13, a second electrode 14 spaced from the first electrode 13, a solid electrolyte 15, and a water absorbing structure 16. The first electrode 13 and the second electrode 14 are spaced apart from each other. The substrate 32 comprises a first surface 322 and a second surface 324 opposite to the first surface 322. The first electrode 13 is located on the first surface 322, and the second electrode 14 is located on the second surface 324. The substrate 32 further comprises a plurality of through holes 320. The plurality of through holes 320 are spaced apart with each other. The plurality of through holes 320 extend throughout the substrate 32 from the first surface 322 to the second surface 324. The solid electrolyte 15 is located in the through holes 320 and connects the first electrode 13 and the second electrode 14. The water absorbing structure 16 is located on the entire surface of the second electrode 14. The self-charging device 30 for energy harvesting and storage further comprises a first terminal pad 17 located on the surface of first electrode 13 away from the substrate 32 and a second terminal pad 18 located on the surface of the second electrode 14 away from the substrate 32.

Figure 18:
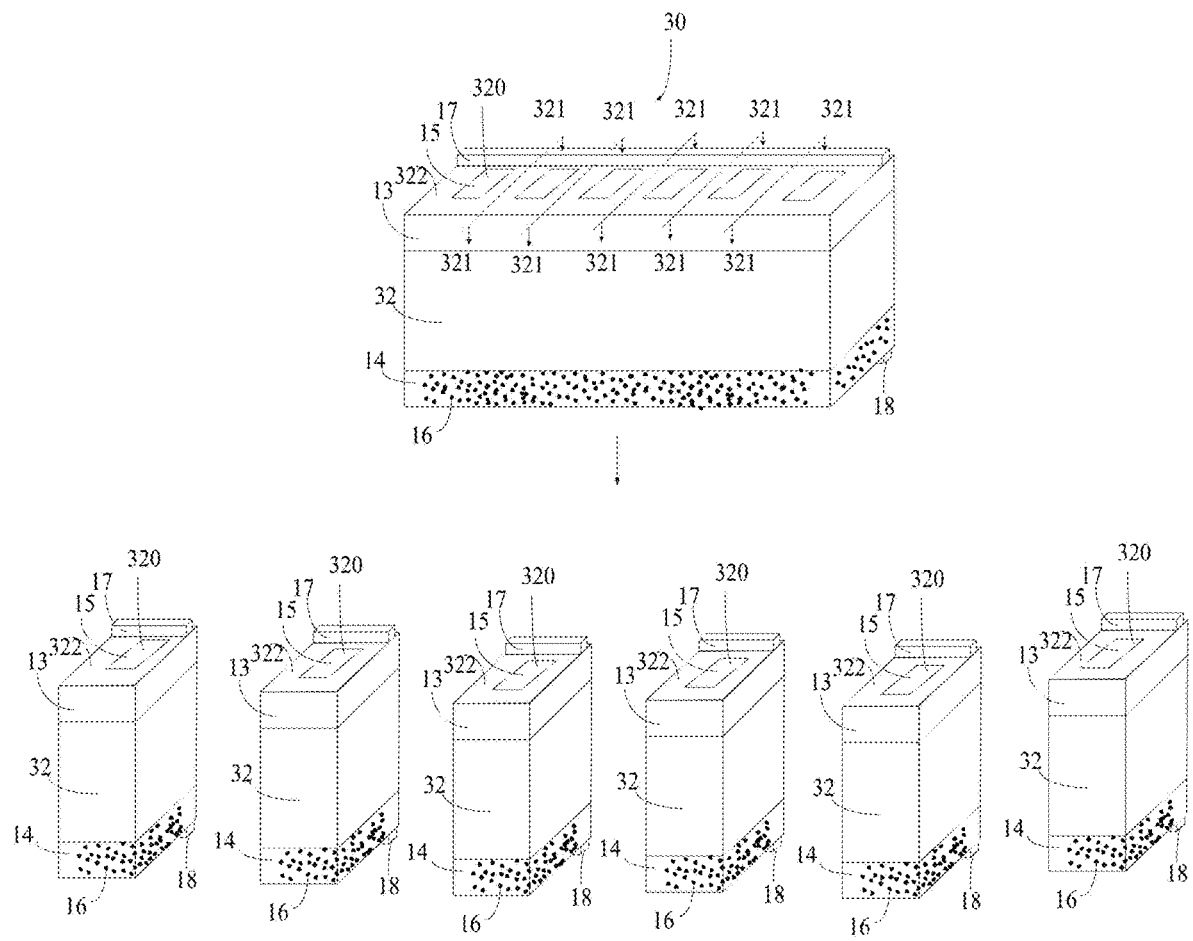
FIG. 18 is a schematic flowchart of a method for dividing the self-charging device 30 for energy harvesting and storage into several small self-charging devices.

The self-charging device 30 for energy harvesting and storage is similar to the self-charging device 10 for energy harvesting and storage above except that the substrate 32 further comprises a plurality of through holes 320 spaced apart from each other. The first electrode 13 is located on the first surface 322, and the second electrode 14 is located on the second surface 324. Since the substrate 32 further comprises a plurality of through holes 320 spaced apart from each other, and each of the plurality of through holes 320 comprises the solid electrolyte 15, the self-charging device 30 can be divided into several small self-charging devices and used independently. The small self-charging devices can include one through hole 320, two through holes 320, three through holes 320, or other number of through holes 320 less than the number of the through holes 320 of the self-charging device 30. In one embodiment, the substrate 32 comprises six through holes 320. The self-charging device 30 for energy harvesting and storage can be divided into six small self-charging devices, and each small self-charging device have one through hole 320. In another embodiment, the substrate 32 comprises six through holes 320. The self-charging device 30 for energy harvesting and storage can be divided into four small self-charging devices, and two of the small self-charging device have one through hole 320, and two of the small self-charging device have two through holes 320. Alternatively, the self-charging device 30 for energy harvesting and storage can be used as a single self-charging device. Referring to FIG. 18 together, a method for dividing the self-charging device 30 for energy harvesting and storage into several small self-charging devices comprises the following steps: providing the self-charging device 30 for energy harvesting and storage; square cutting the area of the substrate 32 between adjacent through holes 320 along a cutting line 321.

Figure 19:
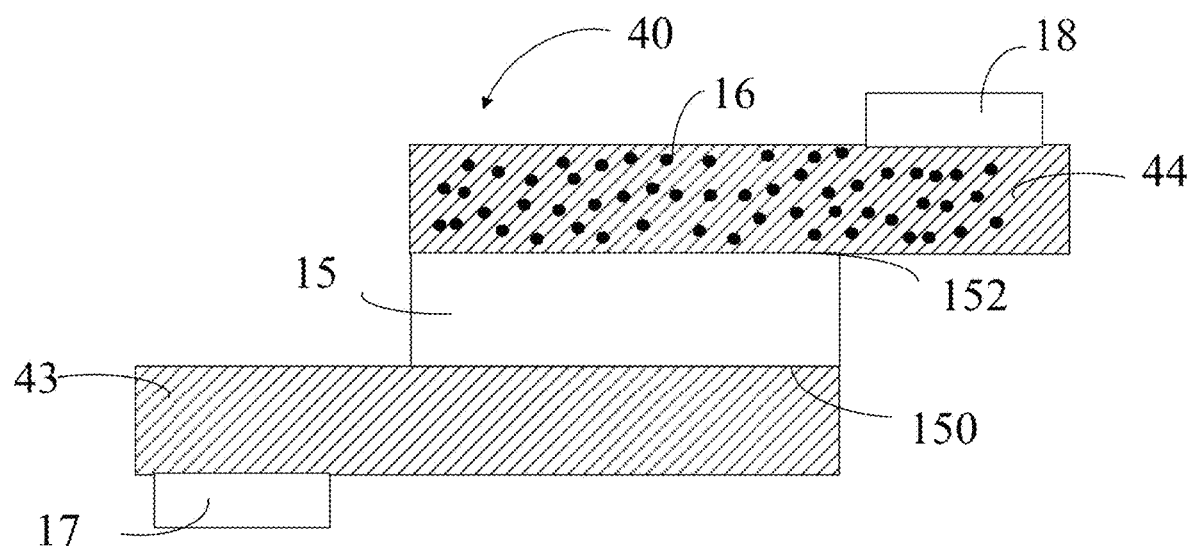
FIG. 19 is a schematic sectional view of another embodiment of a self-charging device for energy harvesting and storage.

Referring to FIG. 19, a self-charging device 40 for energy harvesting and storage of another embodiment is provided. The self-charging device 40 for energy harvesting and storage comprises a first electrode 43, a second electrode 44, and a solid electrolyte 15. The solid electrolyte 15 comprises a third surface 150 and a fourth surface 152 opposite to the third surface 150. The first electrode 43 is located on the third surface and the second electrode 44 is located on the fourth surface 152. The first electrode 43 is a carbon nanotube composite structure (PANI/CNT) comprising a carbon nanotube structure 110 and polyaniline (PANI). The second electrode 44 is a carbon nanotube composite structure (CaCl$_2$/PANI/CNT) comprising a carbon nanotube structure, CaCl$_2$, and PANI. The self-charging device 40 for energy harvesting and storage is a sandwich-like device.

The PANI/CNT composite was synthesized using a in situ method. In one embodiment, the carbon nanotube structure was immersed in an aniline/HCl solution, then equal amount of ammonium peroxidisulfate (ASP) solution was added in to the aniline/HCl solution with the carbon nanotube structure and kept at 0° C. for 24 h. The PANI/CNT composite was sonicated in the $CaCl_2$ solution and dried in an oven to prepare the $CaCl_2$/PANI/CNT. The sandwich-like device was fabricated by assembling PANI/CNT and $CaCl_2$/PANI/CNT together with HCl/PVA gel.

Figure 20:
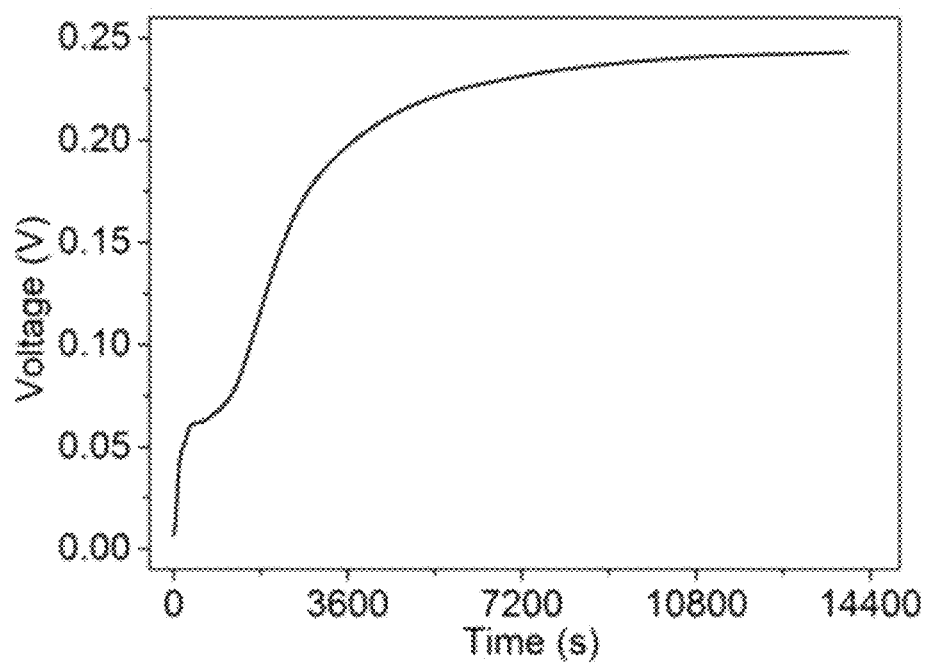
FIG. 20 is Open Circuit Voltage ($V_{OC}$) vs. Time curve of the device of FIG. 17 in a humid environment whose relative humidity is 80%.
Figure 21:
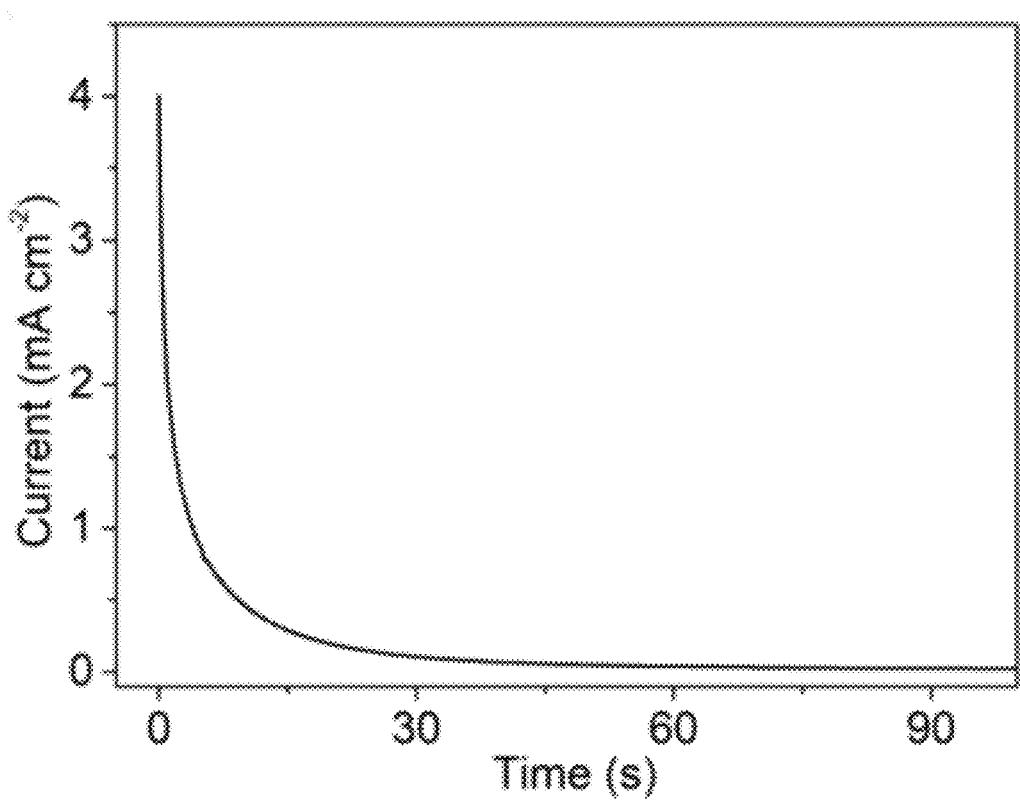
FIG. 21 is a Short Circuit Current density ($I_{SC}$) vs. Time curve of the device of FIG. 17 in a humid environment whose relative humidity is 80%.

The self-charging device 40 for energy harvesting and storage is a sandwich-like device. The first electrode 43, the solid electrolyte 15, and the second electrode 344 are stacked in succession. The sandwich type device can increase the effective area and reduce diffusion distance. The moisture induced self-charging process is shown in FIG. 20 and FIG. 21. The charging rate became slower after 2 hours and finally reached a charging voltage of 0.243V. However, the short-circuited current (ISC) density was enhanced to 4.00 mA $cm^{-2}$ and the outpower density reached 0.243 mW $cm^{-2}$ (12.15 mW $cm^{-3}$), which is 5.2 times of the planar self-charging device 10 for energy harvesting and storage with pure carbon nanotube structure as electrodes. This demonstrates that the improvement of output performance can be realized by proper material election and rational structure design.

The self-charging device for energy harvesting and storage as disclosed has the following advantages. Firstly, the self-charging device for energy harvesting and storage can be fabricated by a simple process. The self-charging device for energy harvesting and storage can be used without complicated external conditions, and not only can realize self-charging but also can store the energy. Secondly, the carbon nanotube structure is used as electrodes. The porous structure of the carbon nanotube structure facilitates the diffusion of water and ions. Thirdly, the device has excellent self-charging and storing energy capacity. The self-charging device for energy harvesting and storage can be charged to 0.348V in a humid environment of 80% relative humidity and the energy can be effectively stored. Output performance of the self-charging device for energy harvesting and storage can be significantly improved by providing a sandwich type device using PNAI/CNT electrodes, which possesses the maximum power density of 0.243 mW $cm^{-2}$. Fourthly, the electrolyte diffusion was driven by absorbing water from moisture automatically. Separation of cations and anions is realized under the diffusion because of their different mobilities in the HCl/PVA gel. Furthermore, the self-charging device for energy harvesting and storage is lightweight, flexible, and has great potential in portable and smart electronics.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A self-charging device for energy harvesting and storage, comprising:
   a first electrode;
   a second electrode spaced from the first electrode;
   a solid electrolyte bridging the first electrode and the second electrode; and
   a water absorbing structure; wherein the water absorbing structure is located on the second electrode, absorbs water from external environment to form absorbed water, and transmits the absorbed water to the solid electrolyte.

2. The self-charging device for energy harvesting and storage of claim 1, further comprising a substrate, wherein the first electrode and the second electrode are located on a surface of the substrate.

3. The self-charging device for energy harvesting and storage of claim 2, wherein the substrate comprises:
   a first surface;
   a second surface opposite to the first surface; and
   a plurality of spaced through holes, wherein the plurality of spaced through holes extend throughout the substrate from the first surface to the second surface, and the solid electrolyte is arranged in the through holes and connects the first electrode and the second electrode.

4. The self-charging device for energy harvesting and storage of claim 2, wherein a material of the substrate is polyethylene terephthalate.

5. The self-charging device for energy harvesting and storage of claim 1, wherein the water absorbing structure is located on the entire surface of the second electrode.

6. The self-charging device for energy harvesting and storage of claim 1, wherein the first electrode and the second electrode both comprises a carbon nanotube structure comprising a plurality of carbon nanotubes intersected with each other to form a net and defining a plurality of openings.

7. The self-charging device for energy harvesting and storage of claim 6, wherein the carbon nanotube structure is a carbon nanotube composite structure comprising a pure carbon nanotube structure and a conductive polymer coated on the pure carbon nanotube structure.

8. The self-charging device for energy harvesting and storage of claim 7, wherein a material of the conductive polymer is poly aniline.

9. The self-charging device for energy harvesting and storage of claim 1, wherein the solid electrolyte comprises a composite gel of polyvinyl alcohol with some ionic compounds.

10. The self-charging device for energy harvesting and storage of claim 9, wherein the composite gel of polyvinyl alcohol with some ionic compounds is HCl/PVA.

11. The self-charging device for energy harvesting and storage of claim 1, wherein the solid electrolyte comprises a third surface and a fourth surface opposite to the third surface, wherein the first electrode is located on the third surface and the second electrode is located on the fourth surface.

12. The self-charging device for energy harvesting and storage of claim 1, wherein a material of the water absorbing structure is calcium chloride.

13. The self-charging device for energy harvesting and storage of claim 1, wherein the water absorbing structure is located only on part surface of the second electrode.

14. The self-charging device for energy harvesting and storage of claim 13, wherein the water absorbing structure is in direct contact with the solid electrolyte.

15. The self-charging device for energy harvesting and storage of claim 1, further comprising a first terminal pad located on the surface of first electrode and a second terminal pad located on the surface of the second electrode.

* * * * *